United States Patent
Friesen et al.

(10) Patent No.: US 10,461,554 B2
(45) Date of Patent: *Oct. 29, 2019

(54) METHOD OF OPERATING ELECTROCHEMICAL CELLS COMPRISING ELECTRODEPOSITED FUEL

(71) Applicant: NANTENERGY, INC., Scottsdale, AZ (US)

(72) Inventors: Cody A. Friesen, Fort McDowell, AZ (US); Joel Hayes, Chandler, AZ (US); Sergey Puzhaev, Scottsdale, AZ (US); Ramkumar Krishnan, Scottsdale, AZ (US); Todd Trimble, Phoenix, AZ (US)

(73) Assignee: NANTENERGY, INC., Scottsdale, AZ (US)

( * ) Notice: Subject to any disclaimer, the term of this patent is extended or adjusted under 35 U.S.C. 154(b) by 195 days.

This patent is subject to a terminal disclaimer.

(21) Appl. No.: 15/337,772

(22) Filed: Oct. 28, 2016

(65) Prior Publication Data

US 2017/0047757 A1    Feb. 16, 2017

Related U.S. Application Data

(63) Continuation of application No. 14/619,373, filed on Feb. 11, 2015, now Pat. No. 9,484,587.

(Continued)

(51) Int. Cl.
*H01M 10/44* (2006.01)
*H02J 7/00* (2006.01)
(Continued)

(52) U.S. Cl.
CPC ....... *H02J 7/0052* (2013.01); *H01M 8/04895* (2013.01); *H01M 8/2404* (2016.02);
(Continued)

(58) Field of Classification Search
CPC ........ H02J 7/0052; H02J 7/0063; H02J 7/007; H02J 7/0068; H02J 7/0057; H01M 10/482;
(Continued)

(56) References Cited

U.S. PATENT DOCUMENTS 3,556,849 A   1/1971   Oswin et al.
4,616,170 A   10/1986  Urstoger
(Continued)

FOREIGN PATENT DOCUMENTS

CN   101252213 A   8/2008
CN   101517792 A   8/2009
(Continued)

OTHER PUBLICATIONS

International Search Report and Written Opinion dated May 12, 2015 for Appln. No. PCT/US2015/015407, Provided in Parent Application.

(Continued)

*Primary Examiner* — Richard Isla
*Assistant Examiner* — Manuel Hernandez
(74) *Attorney, Agent, or Firm* — Pillsbury Winthrop Shaw Pittman, LLP

(57) ABSTRACT

An electrochemical cell system and a process for operating the same, the system having at least two fuel electrodes for receiving electrodeposited metal fuel; at least one oxidant electrode spaced apart from the fuel electrode; at least one charging electrode; an ionically conductive medium communicating the electrodes of the electrochemical cell system for conducting ions to support electrochemical reactions at the fuel, oxidant, and charging electrodes; and, one or more controllers configured to operate the cell system in discharging and charging modes and monitor a state of charge for each fuel electrode. The controllers may assign each fuel (Continued)

electrode in a discharging unit having a state-of-charge meeting a predetermined depletion criteria from the discharging unit to the charging unit, and each fuel electrode in the charging unit having a state-of-charge meeting a predetermined loading criteria from the charging unit to the discharging unit.

19 Claims, 3 Drawing Sheets

Related U.S. Application Data

(60) Provisional application No. 61/938,922, filed on Feb. 12, 2014.

(51) Int. Cl.
| | |
|---|---|
| *H01M 8/04858* | (2016.01) |
| *H01M 8/2404* | (2016.01) |
| *H01M 10/06* | (2006.01) |
| *H01M 10/42* | (2006.01) |
| *H01M 12/08* | (2006.01) |
| *H01M 10/48* | (2006.01) |

(52) U.S. Cl.
CPC ....... *H01M 10/06* (2013.01); *H01M 10/4207* (2013.01); *H01M 10/4242* (2013.01); *H01M 10/44* (2013.01); *H01M 10/441* (2013.01); *H01M 10/448* (2013.01); *H01M 10/482* (2013.01); *H01M 12/08* (2013.01); *H02J 7/007* (2013.01); *H02J 7/0063* (2013.01); *H01M 2010/4292* (2013.01); *H02J 7/0057* (2013.01); *H02J 7/0068* (2013.01); *Y02E 60/126* (2013.01); *Y02E 60/128* (2013.01)

(58) Field of Classification Search
CPC ............. H01M 10/06; H01M 10/4207; H01M 10/448; H01M 10/441; H01M 10/4242; H01M 12/08; H01M 8/04895; H01M 2010/4292; H01M 10/44; H01M 8/2404; Y02E 60/128; Y02E 60/126
USPC .................................. 320/134; 429/402–407
See application file for complete search history.

(56) References Cited

U.S. PATENT DOCUMENTS

| | | | |
|---|---|---|---|
| 4,691,158 A | 9/1987 | Hashimoto et al. | |
| 4,730,153 A | 3/1988 | Breting et al. | |
| 4,857,419 A | 8/1989 | Jinnai et al. | |
| 5,302,472 A | 4/1994 | Ando et al. | |
| 5,998,968 A | 12/1999 | Pittman et al. | |
| 7,642,749 B2 | 1/2010 | Nishida | |
| 7,939,190 B2 | 5/2011 | Colello et al. | |
| 8,491,763 B2 | 7/2013 | Friesen | |
| 8,492,052 B2 | 7/2013 | Friesen et al. | |
| 8,659,268 B2 | 2/2014 | Krishnan et al. | |
| 8,877,391 B2 | 11/2014 | Friesen et al. | |
| 8,895,197 B2 | 11/2014 | Friesen et al. | |
| 8,906,563 B2 | 12/2014 | Friesen et al. | |
| 8,911,910 B2 | 12/2014 | Krishnan et al. | |
| 9,312,572 B2 | 4/2016 | Trimble et al. | |
| 9,325,037 B2 | 4/2016 | Trimble et al. | |
| 9,440,132 B2 | 9/2016 | Brewer et al. | |
| 2004/0265684 A1* | 12/2004 | Faris ..................... | H01M 8/184 429/61 |
| 2008/0003490 A1* | 1/2008 | Christensen ........ | H01M 6/5005 429/61 |
| 2010/0316935 A1 | 12/2010 | Friesen et al. | |
| 2011/0070500 A1 | 3/2011 | Chen et al. | |
| 2011/0070506 A1* | 3/2011 | Friesen ............. | H01M 8/04873 429/404 |
| 2011/0081563 A1 | 4/2011 | Christensen et al. | |
| 2011/0250512 A1 | 10/2011 | Friesen et al. | |
| 2012/0015264 A1 | 1/2012 | Friesen et al. | |
| 2012/0068667 A1 | 3/2012 | Friesen et al. | |
| 2012/0098499 A1 | 4/2012 | Friesen et al. | |
| 2012/0139496 A1 | 6/2012 | Krishnan et al. | |
| 2012/0202127 A1 | 8/2012 | Friesen et al. | |
| 2012/0270130 A1* | 10/2012 | Lemaire ............ | H01M 8/04007 429/442 |
| 2012/0321969 A1 | 12/2012 | Friesen et al. | |
| 2013/0022881 A1 | 1/2013 | Friesen et al. | |
| 2013/0049694 A1 | 2/2013 | Friesen | |
| 2013/0115523 A1 | 5/2013 | Friesen et al. | |
| 2013/0115525 A1 | 5/2013 | Friesen et al. | |
| 2013/0115526 A1 | 5/2013 | Friesen et al. | |
| 2013/0115533 A1 | 5/2013 | Friesen et al. | |
| 2014/0091631 A1 | 4/2014 | Naden et al. | |
| 2015/0104679 A1 | 4/2015 | Trimble | |
| 2015/0303530 A1* | 10/2015 | Toussaint .............. | H01M 10/44 320/134 |
| 2017/0214265 A1* | 7/2017 | Stevens ................. | H01M 10/44 |

FOREIGN PATENT DOCUMENTS

| | | |
|---|---|---|
| CN | 101568846 A | 10/2009 |
| CN | 102456934 A | 5/2012 |
| EP | 1 544 937 | 6/2005 |
| JP | 1-190224 A | 7/1989 |
| JP | 07-099731 A | 4/1995 |
| JP | 2009-543294 A | 12/2009 |
| JP | 2013-505544 A | 2/2013 |

OTHER PUBLICATIONS

International Preliminary Report on Patentability dated Jan. 19, 2016 for Appln. No. PCT/US2015/015407, Provided in Parent Application.
Office Action issued in corresponding Chinese Patent Application No. 2015800146006 dated May 10, 2018 with English translation.
Examination Report Australian Patent Application No. 2015217236 dated Oct. 23, 2018.
Office Action Japanese Patent Application No. 2016-550772 dated Dec. 25, 2018 with English translation.

* cited by examiner

METHOD OF OPERATING ELECTROCHEMICAL CELLS COMPRISING ELECTRODEPOSITED FUEL

This application claims priority to U.S. Provisional Application No. 61/938,922, filed Feb. 12, 2014 and U.S. patent application Ser. No. 14/619,373, filed Feb. 11, 2015 and issuing under U.S. Pat. No. 9,484,587 on Nov. 1, 2016, the contents of which both are incorporated by reference in their entireties herein.

FIELD

The invention relates to electrochemical cells comprising electrodeposited metal fuel, and more particularly to a method of operating and conditioning electrochemical cell systems comprising electrodeposited metal fuel.

BACKGROUND

Various types of electrochemical cells using metal as the fuel are known such as metal-air, Pb-acid, Ni—Cd and Ni—Zn batteries. For example, a metal-air cell typically comprises a fuel electrode at which metal fuel is oxidized and an air breathing cathode at which oxygen from ambient air is reduced during a discharge mode. During a charge mode, the metal fuel is reduced and electrodeposited at the fuel electrode, thereby storing the metal fuel for a future discharge process. A significant challenge with these types of cells is managing non-uniform deposits of metal fuel upon repeated charge/discharge cycling which can lead to electrode passivation, reduced charge capacities, poor cycling behavior, shorter cycle life and lower overall cell efficiency. The build-up of metal fuel (e.g. rough deposits, formation of dendrites) can cause problems including premature formation of electrical connections between electrodes and cell shorting. These problems are intensified after repeated partial cycling i.e. repeated cycles discharging to a low depth-of-discharge (DOD) directly followed by charging. The issues associated with partial cycling are well-known, for example in Ni—Cd batteries and is termed the "memory-effect." Numerous successive cycles of partial discharging and charging produce small memory effects which can add up to a large memory effect. These effects can lead to errors in estimation of the state of charge (SOC) of the battery i.e. the amount of useable charge stored within the battery, as well as lead to non-uniform and rough deposits of metal on the fuel electrode during charging.

Among other things, the present application endeavors to provide an effective and improved way of operating electrochemical cells comprising electrodeposited metal fuel, minimizing non-uniformity and roughness of metal fuel deposits on cycling while enhancing cycle life and operating efficiency.

SUMMARY

One aspect of the present invention provides a process for operating an electrochemical cell system, wherein the electrochemical cell system comprises: (i) at least two fuel electrodes for receiving electrodeposited metal fuel; (ii) at least one oxidant electrode spaced apart from the fuel electrode; (iii) at least one charging electrode; (iv) an ionically conductive medium communicating the electrodes of the electrochemical cell system for conducting ions to support electrochemical reactions at the fuel, oxidant, and charging electrodes, the ionically conductive medium comprising reducible metal fuel ions; wherein the process comprises: (i) assigning the fuel electrodes into units, the units comprising: a discharging unit and a charging unit; (ii) operating said cell system in a discharge mode wherein the metal fuel is oxidized at each fuel electrode in the discharging unit and an oxidant is reduced at the at least one oxidant electrode to generate an electrical discharge current therebetween for application to a load; (iii) operating said cell system in a charging mode wherein a reducible species of the fuel is reduced to electrodeposit the fuel on each fuel electrode in the charging unit and oxidize an oxidizable species of the oxidant at the charging electrode by application of an electrical charge current therebetween from a power source; (iv) monitoring a state-of-charge for each fuel electrode, unit wherein each fuel electrode in the discharging unit having a state-of-charge meeting a predetermined depletion criteria is assigned from the discharging unit to the charging unit; and wherein each fuel electrode in the charging unit having a state-of-charge meeting a predetermined loading criteria is assigned from the charging unit to the discharging unit.

Another aspect of the present invention provides an electrochemical cell system, wherein the electrochemical cell system comprises: (i) at least two fuel electrodes for receiving electrodeposited metal fuel; (ii) at least one oxidant electrode spaced apart from the fuel electrode; (iii) at least one charging electrode; (iv) an ionically conductive medium communicating the electrodes of the electrochemical cell system for conducting ions to support electrochemical reactions at the fuel, oxidant, and charging electrodes, the ionically conductive medium comprising reducible metal fuel ions; and, one or more controllers configured to: assign the fuel electrodes into units, the units comprising: a discharging unit and a charging unit; operate the cell system in a discharging mode wherein the metal fuel is oxidized at each fuel electrode in the discharging unit and an oxidant is reduced at the at least one oxidant electrode to generate an electrical discharge current therebetween for application to a load, operate the cell system in a charging mode wherein a reducible species of the fuel is reduced to electrodeposit the fuel on each fuel electrode in the charging unit and oxidize an oxidizable species of the oxidant at the charging electrode by application of an electrical charge current therebetween from a power source, monitor a state-of-charge for each fuel electrode, wherein the one or more controllers is further configured to assign each fuel electrode in the discharging unit having a state-of-charge meeting a predetermined depletion criteria from the discharging unit to the charging unit, and wherein the one or more controllers is further confirgured to assign each fuel electrode in the charging unit having a state-of-charge meeting a predetermined loading criteria from the charging unit to the discharging unit.

Other objects, features and advantages of the present invention will become apparent from the following detailed description, the accompanying drawings and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
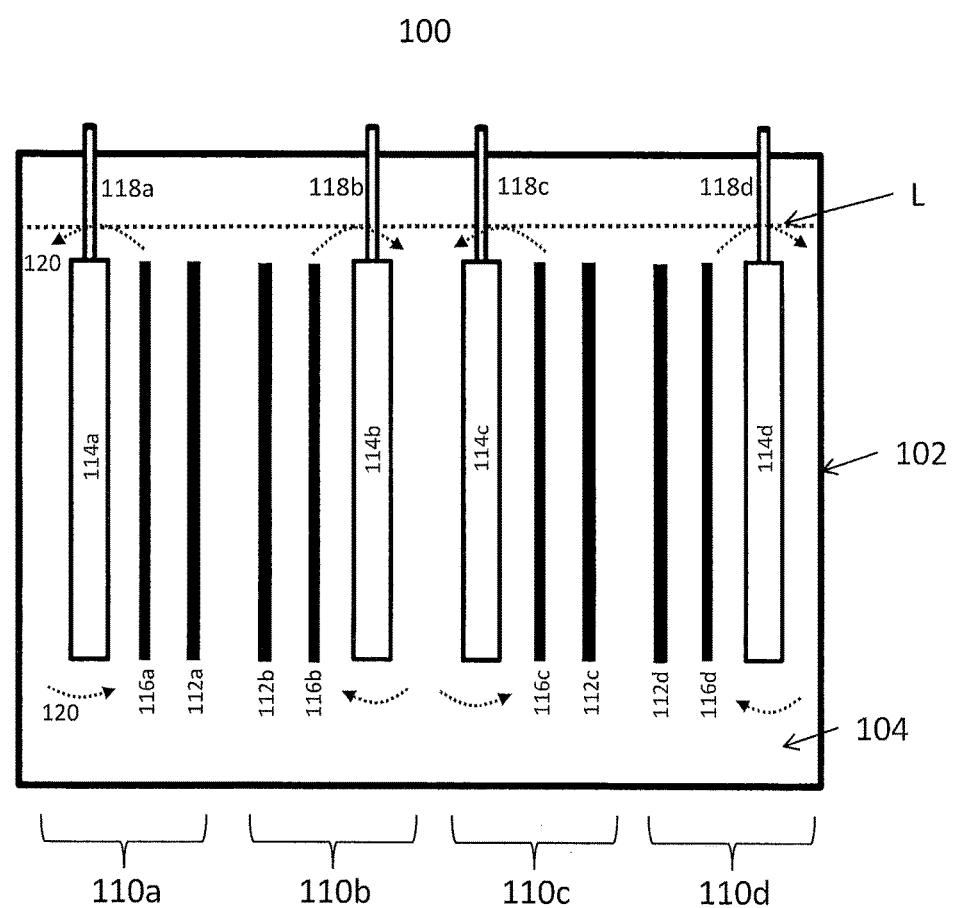
FIG. 1 depicts a cross-sectional view of an electrochemical cell system that comprises four electrochemical cells.

As a non-limiting exemplary embodiment of the invention, FIG. 1 illustrates a schematic cross sectional view of electrochemical cell system 100. As shown, the components of electrochemical cell system 100 may be contained at least partially in an associated housing 102 defining an interior cell chamber, generally depicted at 104, configured to contain a volume of ionically conductive liquid therein. In an embodiment, discrete housings 102 may be linked to share the volume of ionically conductive liquid distributed across the housings 102, and may circulate between the housings 102 (e.g., driven by a fluid pump). In an embodiment, the system 100 utilizes a liquid ionically conductive medium that is contained within a common housing 102, and is configured to circulate therein to conduct ions within the cell system 100. In an embodiment, the amount of liquid ionically conductive medium within the housing 102 may reach a level L. While at times the ionically conductive medium may be generally stationary within the housing 102, such as in a stagnant zone, it may be appreciated that the cell system 100 may be configured to create a convective flow of the ionically conductive medium. In some embodiments, the flow of the ionically conductive medium may be a convective flow generated by bubbles of evolved gas in the cell 100, such as is described in the U.S. patent application Ser. Nos. 13/531,962; 13/532,374 and 13/666,864 incorporated herein in their entirety. Various portions of the electrochemical cell 100 may be of any suitable structure or composition, including but not limited to being formed from plastic, metal, resin, or combinations thereof. Accordingly the cell 100 may be assembled in any manner, including being formed from a plurality of elements, being integrally molded, or so on. In various embodiments the electrochemical cell system 100 may include elements or arrangements from one or more of U.S. Pat. Nos. 8,168,337; 8,309,259; and U.S. patent application Ser. Nos. 12/549,617; 12/631,484; 12/776,962; 12/885,268; 12/901,410; 13/028,496; 13/083,929; 13/167,930; 13/185,658; 13/230,549; 13/277,031; 13/299,167; 13/362,775; 13/526,432; 13/531,962; 13/532,374; 13/666,864; 13/668,185; 61/707,478; 61/763,428 and 61/890,728; each of which are incorporated herein in their entireties by reference.

In an embodiment of the cell system 100, such as that illustrated in FIG. 1, multiple cells 110 may optionally be installed together in a common housing 102. Such an assembly may increase energy and/or power density, may facilitate desired flow directions based on the interaction of bubbles generated from each cell, may reduce production costs by reducing the number of discrete parts therein or otherwise. The assembly of FIG. 1 contains four cells 110 therein, and thus may be referred to as a quad-cell 100. It may be appreciated that the four cells (individually cell 110a, 110b, 110c and 110d) define quad-cell 100, although fewer or additional cells may also be included in other embodiments (i.e. forming a bi-cell, tri-cell, a penta-cell, or so on). Although in some embodiments cells 110 may share common electrodes, in other embodiments, such as that shown, each cell 110a, 110b, 110c and 110d contains its own associated fuel electrode 112, oxidant electrode 114 and charging electrode 116 (i.e. spaced from one another). As depicted in FIG. 1, fuel electrode 112a, oxidant electrode 114a and charging electrode 116a are associated with cell 110a. Similarly, fuel electrode 112b, oxidant electrode 114b and charging electrode 116b are associated with cell 110b; fuel electrode 112c, oxidant electrode 114c and charging electrode 116c are associated with cell 110c; and fuel electrode 112d, oxidant electrode 114d and charging electrode 116d are associated with cell 110d. In some embodiments, however, a fuel electrode 112 of one cell 110 may be understood as participating in electrochemical reactions with oxidant reduction electrodes 114 and/or charging electrodes 116 associated with other cells 110 (e.g. fuel electrode 112a associated with cell 110a may be coupled to oxidant reduction electrode 114b and/or charging electrode 116b associated with cell 110b).

Fuel electrodes 112 of cell system 100 may be supported in the interior cell chamber 104 so as to be contacted by the ionically conductive medium. In an embodiment, a fuel electrode 112 is a metal fuel electrode that functions as an anode when the cell system 100 operates in discharge, or electricity generating mode and functions as a cathode when the cell system 100 operates in charge, or electricity consuming mode. The fuel may be provided to the cell 100 as particles suspended in the ionically conductive medium or ions. The fuel electrode may be provided as a permeable electrode body (mesh, screen, etc.) or a series of permeable electrode bodies arranged in spaced apart relation. A permeable electrode body may include a screen that is made of any formation that is able to capture and retain, through electrodeposition, or otherwise, particles or ions of metal fuel from the ionically conductive medium that flows through or is otherwise present within the cell chamber 104. Further details regarding permeable electrode bodies, configurations and operation thereof may be described in U.S. Pat. Nos. 8,168,337; 8,309,259; Ser. Nos. 12/885,268; 13/167,930; 13/230,549; 13/277,031; 13/299,167; previously incorporated by reference above.

The fuel used in the cell 100 may be a metal, such as iron, zinc, aluminum, magnesium, lead, cadmium, nickel or lithium. By metal, this term is meant to encompass all elements regarded as metals on the periodic table, including but not limited to alkali metals, alkaline earth metals, lanthanides, actinides, semi-metals, "poor" metals, post-transition and transition metals, either in atomic, molecular (including metal hydrides), or alloy form when collected on the electrode body. However, the present invention is not intended to be limited to any specific fuel, and others may be used.

The illustrated embodiment of FIG. 1 depicts a single fuel electrode 112 associated with each cell 110, however in some embodiments the fuel electrode 112 may comprise a plurality of permeable electrode bodies such as described in U.S. Pat. No. 8,309,259 and U.S. application Ser. Nos. 13/299,167 and 13/230,549. The electrode bodies may have different sizes so that a stepped scaffold configuration may be used, for example as described by U.S. patent application Ser. No. 13/167,930 and incorporated by reference above, in other embodiments the electrodes may have substantially the same size. In some embodiments, a common fuel electrode 112 may be the fuel electrode for a plurality of adjacent cells 110. For example, in the illustrated embodiment, fuel electrode 112a and fuel electrode 112b may be replaced by a common fuel electrode shared by both cell 110a and cell 110b.

In an embodiment, the oxidant reduction electrode 114 may be of any appropriate construction or configuration. For example, the oxidant reduction electrode 114 may generally be configured to support oxygen reduction in the electrochemical cell system 100, to create a potential difference with the fuel electrode 112 during discharge of the cell system 100. In an embodiment, the oxidant reduction electrode 114 may contain an active layer having meshes or coatings that may be characterized as "active material(s)". The active material(s) facilitate the electrochemical reactions associated with oxygen reduction. Accordingly, in an embodiment, the oxidant reduction electrode 114 is positioned in the cell chamber 104 such that the active materials contact the ionically conductive medium allowing ions to be conducted to and/or from the fuel electrode 112. In some embodiments, the active materials of the oxygen reduction electrode may be formed by a mixture of catalyst particles or materials, conductive matrix and hydrophobic materials, combined to form a composite material or otherwise layered together. In various embodiments the active materials may be constructed of one or more metals and/or their oxides, such as but not limited to manganese, silver, nickel, platinum, lanthanum, strontium, and cobalt. For further details regarding oxidant electrodes, reference may be made to U.S. patent application Ser. Nos. 13/531,962 13/553,269; 13/668,180; and 13/668,185 previously incorporated by reference herein in their entirety.

In an embodiment, the oxidant reduction electrode 114 may be sealed or otherwise assembled into an oxidant reduction electrode module that is immersed into the ionically conductive medium in the cell chamber 104. At least one air channel 118 (individually air channels 118a, 118b, 118c and 118d) may extend into the oxidant reduction electrode module, so as to provide air or any other oxidant to the oxidant reduction electrode 114. Further details of such a configuration are described in U.S. patent application Ser. No. 13/531,962 previously incorporated by reference in its entirety herein.

As shown, in embodiments containing a separate charging electrode 116, the charging electrode 116 may be positioned between the oxidant reduction electrode 114 and the fuel electrode 112. In embodiments of the cell 110 lacking a separate charging electrode 116, the oxidant reduction electrode 114 may be utilized both during charging and discharging of the cell 110 (i.e. as an anode during charging and as a cathode during discharging). Thus, the term charging electrode may be understood as being a component that performs the charging electrode function at an anodic potential during charging, and while it may be separate from other electrodes, in some embodiments it may be constituted by one of the other electrodes or a part thereof functioning in that role.

In the illustrated embodiment of FIG. 1, associated with each cell 100 are charging electrodes 116. Although in the illustrated embodiment the charging electrode 116 is spaced from the fuel electrode 112, it may be appreciated that in some embodiments the charging electrode 116 may comprise a portion of the fuel electrode 112, requiring a suitable electrically insulating material. As shown, the dedicated charging electrode 116 may generally be positioned between the fuel electrode 112 and the oxidant reduction electrode 114; however various other arrangements are also possible. A charging electrode 116 may be positioned spaced from the fuel electrode 112. In some embodiments, the charging electrode 116 may be an electrically isolated portion of the fuel electrode 112 (including, for example, being one or more of the permeable electrode bodies). As with the fuel electrode 112, the charging electrode 116 may be positioned within the cell chamber 104, so as to be in contact with the ionically conductive medium. The charging electrode 116 may be configured to participate in the oxidation of an oxidizable oxidant species, which is present in the liquid ionically conductive medium, so as to promote the reduction of an oxidized metal fuel species and growth of the metal fuel on the fuel electrode 112 during charging of cell 110. Accordingly, in some embodiments, the charging electrode 116 may be characterized as an oxygen evolving electrode, due to formation of gaseous species formed during the reduction process at the charging electrode 116 during the charging of the electrochemical cell 110.

In an embodiment, bubbles formed during charging may rise from where they are evolved on the charging electrode 116 towards the liquid electrolyte level L, and develop a flow of the ionically conductive medium. It may be appreciated that the spaced arrangement of the charging electrodes 116 may generally drive the bubbles, and thus the flow, away from one another, over the opposing oxidant reduction electrodes 112, a flow pattern which is generally depicted by arrows 120. Various other flow patterns of the ionically conductive medium are also possible, for example, such as those described in U.S. patent application Ser. Nos. 13/532,374 and 13/666,864 previously incorporated by reference herein in their entirety. Furthermore, although not illustrated in FIG. 1, in some embodiments, diffusers, flow diverters or other flow modifying bodies may be implemented.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, lithium hydroxide or lithium chloride. In some embodiments, the ionically conductive medium is aqueous potassium hydroxide. In an embodiment, the ionically conductive medium may comprise an electrolyte. For example, a conventional liquid electrolyte solution may be used, or a room temperature ionic liquid may be used, as mentioned in U.S. patent application Ser. No. 12/776,962, previously incorporated by reference above. In some embodiments, additives may be added to the ionically conductive medium, including but not limited to additives that enhance the electrodeposition process of the metal fuel on fuel electrode 112, such as is described in U.S. patent application Ser. Nos. 13/028,496; 13/526,432; 61/780,322 and 61/780,662; previously incorporated by reference above. Such additives may control dendritic growth of fuel particles, reduce the likelihood of fuel particles separating from fuel electrode 112 during discharge and/or create an undesirable electrical contact between electrodes internal to the cell system 100, for example.

In various non-limiting embodiments, the fuel electrode 112, the oxidant reduction electrode 114 and the separate charging electrode 116 may be connected by a switching system that may be configured to connect the cell 110 and cell system 100 to a power supply, a load, or other cells in series and/or parallel. During discharge, fuel electrodes 112 are connected to the load, and operate as an anode so that electrons given off by the metal fuel, as the fuel is oxidized at the fuel electrode 112, flows to the external load. The oxidant reduction electrodes 114 function as the cathode during discharge, and are configured to receive electrons from the external load and reduce an oxidizer that contacts oxidant reduction electrode 114, specifically oxygen in the air surrounding cell 110, oxygen being fed into cell 110, or oxygen recycled from cell 110. During charge, fuel electrode 112 is connected to the power supply, and operates as a cathode so that oxidized fuel within the ionically conductive medium is reduced at fuel electrode 112. The charging electrode 116 functions as the anode during charge, and oxidizes the reduced oxidant that contacts charging electrode 116, specifically evolving oxygen into the ionically conductive medium. Various switching system configurations and operations thereof are possible, for example, such as those described in U.S. Pat. No. 8,309,259 and U.S. application Ser. Nos. 12/885,268; 13/083,929; 13/299,167; 13/230,549 and 13/277,031 previously incorporated by reference herein in their entirety.

It may be appreciated that the electrochemical reactions occurring during charging and discharging of the cell system 100 may be reduction-oxidation (redox) reactions. For example, in an embodiment where the metal fuel is zinc, the ionically conductive medium may contain reducible zinc ions that are to be plated as zinc fuel on the fuel electrode 112. In one such embodiment, the reduction reaction takes place at fuel electrode 112 (the reduction site), and may conform to $Zn(OH)_4^{2-}+2e^- \rightarrow Zn+4OH^-$. The corresponding oxidation reaction occurs at charging electrode 116, and may conform to $2OH^- \rightarrow H_2O+\frac{1}{2}O_2+2e^-$. The charging electrode 116 is therefore understood to be producing oxygen gas within the cell system 100, and thus may be characterized as an oxygen evolving electrode. It may be appreciated that in some embodiments different metal fuels are utilized, and thus other reactions may occur, which may also evolve oxygen or other gases in cell system 100.

In an embodiment where the metal fuel is zinc, the oxidation reaction may correspond to the equation $Zn \rightarrow Zn^{2+}+2e^-$. The zinc ions may bond with hydroxide ions in the ionically conductive medium, in a manner that corresponds to $Zn^{2+}+4OH^- \rightarrow Zn(OH)_4^{2-}$. The zincate ($Zn(OH)_4^{2-}$) could then flow in the ionically conductive medium, and be available for reduction to zinc fuel at fuel electrode 112 during a future charging of cell system 100.

It may be appreciated that electrodeposition of metal fuel on a pristine fuel electrode (i.e. fuel electrode lacking previously deposited metal fuel) results in accumulation of metal fuel as a smooth layer over the entire fuel electrode surface with minimal non-uniformity, dendrites etc. Conversely, electrodeposition on metal fuel electrodes comprising metal fuel from previous cycling can result in non-uniform metal fuel electrodeposits. These non-uniformities are intensified after repeated partial cycling i.e. repeated discharge directly followed by charging (or in other words, discharging directly to a state of charge greater than 0 SOC, followed by a charging process).

It may be appreciated that non-uniform deposits of metal fuel build up upon repeated charge/discharge cycling which can lead to electrode passivation, reduced charge capacities, poor cycling behavior, shorter cycle life and lower overall cell efficiency. Not to be bound by any particular theory, but non-uniform deposits continue to build up due to high electric field strength at existing deposits which results in preferential deposition in these areas of non-uniformity. The build-up of metal fuel (e.g. formation of dendrites) can cause problems including premature formation of electrical connections between electrodes and cell shorting. The issues associated with partial cycling are well-known, for example in Ni—Cd batteries and is termed the "memory-effect." These effects can also lead to errors in estimation of the state of charge (SOC) of the battery i.e. the amount of useable charge stored within the battery (or in other words, the ratio, expressed in a percentage, of the amount of charge stored in the battery in its current state to the total amount of charge the battery is capable of storing).

An electrode reset, or deep discharge process, may remove non-uniform accumulated metal fuel buildup. A separate, time-consuming deep discharge process may not be viable during a normal operation mode of the battery and may require initiation of a conditioning or reset process (e.g. to remove accumulated metal fuel buildup or dendritic formations). Various conditioning and resetting processes are possible, for example such as those described in U.S. patent application Ser. No. 13/277,031 entitled "Battery Resetting Process for Scaffold Fuel Electrode" and U.S. Provisional Patent Application No. 61/890,728 entitled "Method of Operating and Conditioning Electrochemical Cells Comprising Electrodeposited Metal Fuel," previously incorporated by reference herein in their entirety.

The invention described herein is directed to a system and method for operating electrochemical cells comprising electrodeposited fuel wherein charge/discharge cycling in a normal operating mode proceeds such that metal fuel deposition initiates at metal fuel electrodes with minimal partial cycling history. The configuration of the cell system and associated method of operation is constructed such that metal fuel electrodes are free from "memory" of previous charge/discharge cycles. Various embodiments and advantages of this system will be described in the following paragraphs.

The electrochemical cell system 100 may be charge/discharge cycled such that charging initiates at depleted metal fuel electrodes (i.e. metal fuel electrodes which have been previously discharged to a point meeting a predetermined depletion criteria, such as a predetermined depleted state-of-charge, thereby avoiding partial cycling conditions). This is a control process designed to minimize charging a fuel electrode that has undergone only partial discharge. For example, if fuel electrodes 112a and 112c undergo a partial discharge, the subsequent charge occurs on fuel electrodes 112b and 112d. The next discharge event would then initiate continuing to use fuel electrodes 112a and 112c. If the discharge event stops (e.g. the power grid becomes available) before fuel electrodes 112a and 112c are fully discharged (i.e., meet the depletion criteria), the subsequent charge would again initiate on fuel electrodes 112b and 112d. Alternatively, if the discharge event fully discharges the fuel electrodes 112a and 112c (i.e., meet the depletion criteria), discharging is then switched to the previously partially charged fuel electrodes 112b and 112d, ensuring continuous, uninterrupted discharge to a load. The fuel electrodes 112a and 112c are then considered to be deep discharged, or depleted (as used herein, depleted need not mean 100% depletion). A subsequent charging process is then initiated on fuel electrodes 112a and 112c, with fuel electrodes 112b and 112d being left in a state of partial charge (left from the previous discharge step). By this method, charging only occurs on electrodes that have been previously deeply discharged, or partially most recently charged, as opposed to a fuel electrode that has been most recently partially discharged. Under these conditions, the pair of fuel electrodes 112a and 112c or 112b and 112d can have a state of charge of between 0 and 100%, and the sum of the state of charges of fuel electrodes 112a and 112c plus 112b and 112d will be 100% after the charge cycle is complete. Of course, absolute numbers like 0% and 100% need not be used, and other lower and upper thresholds may be used.

In some embodiments, certain electrodes are purposefully grouped or assigned together for any suitable reason related to the chemistry, configuration and geometry of cell 100. For example, electrode pairs 112a/112c and 112b/112d may be paired together because if 112a/112b are paired, then only two cathodes 114c/114d will be available to provide power, which may be inadequate. If 112a/112d and 112b/112c are paired, then desirable convection characteristics of cell 100 may be non-uniform.

As another example, if a discharging unit fuel electrode is discharged e.g. from 100% SOC to 50% SOC on a first initiation discharge step and power from the electrochemical cell system is no longer needed (e.g. the grid becomes available), that fuel electrode may then become inactive during a subsequent charging mode of the electrochemical cell system. When power from the electrochemical cell system is required again (e.g. the grid becomes unavailable), the same discharging unit fuel electrode will become active by discharging e.g from 50% SOC to a predetermined depleted state-of-charge or for example, until the grid becomes available again.

As yet another simplified example, the anodes 112 are divided into two unit e.g. unit A and unit B; with a cell 100 containing an equal number of anodes in each unit. First, unit A gets a full charge. Subsequently, in cycles #1-N, unit A anodes are discharged in every cycle until the SOC of group A (the discharging unit) meets the depletion criteria. The amount of charge (Ah) necessary to reach the loading criteria in every cycle #1-N is deposited at the anodes of group B (the charging unit). After unit A anodes are completely discharged and unit B anodes are completely charged, these groups switch their functions: unit B becomes the discharging unit and unit A becomes the charging unit. This way of operating cell 100 avoids partial state of charge cycling (PSOC) because anodes only encounter full charge—full discharge "agglomerated cycles." The tern unit is used to denote that each unit may have one or more fuel electrodes assigned to it. Typically, these will be equal numbers, but is some embodiments that may not be the case.

Figure 2:
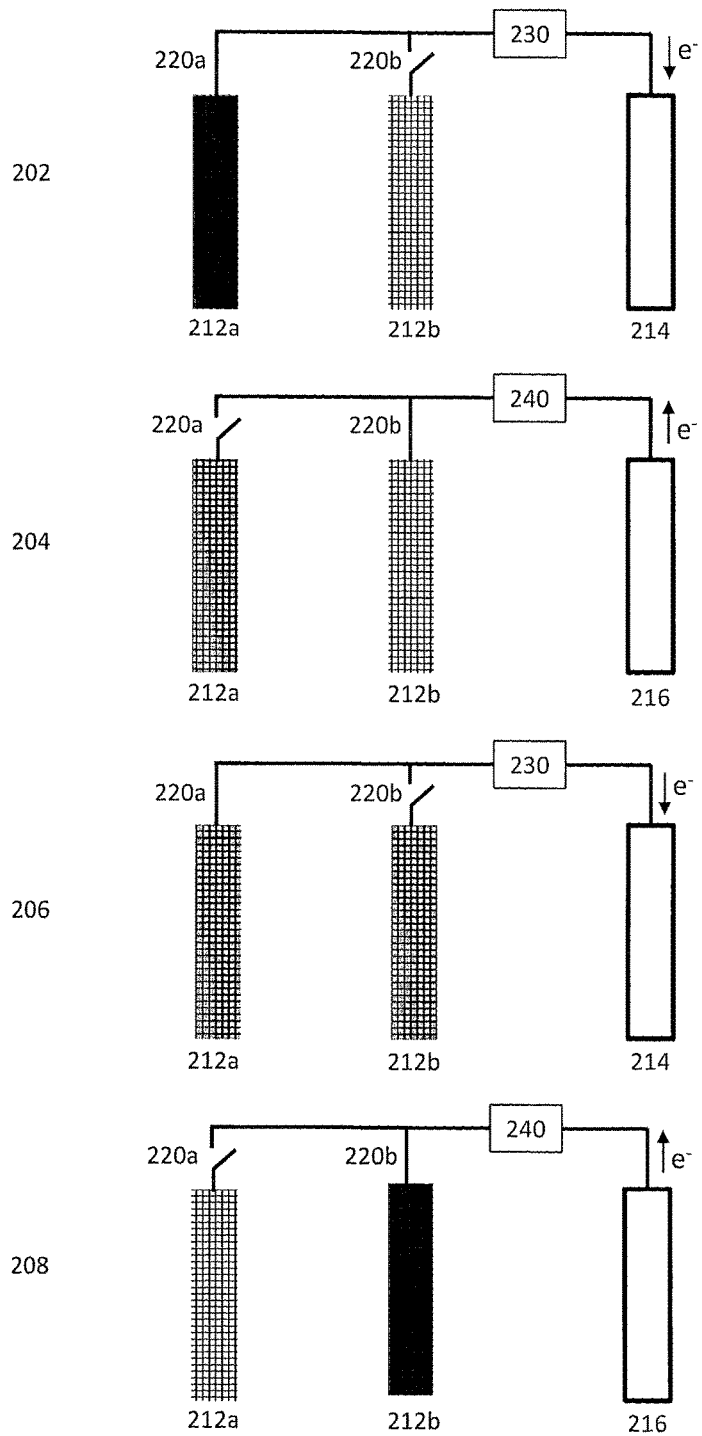
FIG. 2 depicts a simplified process of operating an electrochemical cell system comprising two fuel electrodes.

In the simplified embodiment depicted in FIG. 2, fuel electrode 212a, fuel electrode 212b, oxidant reduction electrode 214 and charging electrode 216 are within a common ionically conductive medium. It should be appreciated that more electrodes are likely employed and various arrangements of multiple electrodes are possible; only two fuel electrodes (212a and 212b), a singular oxidant reduction electrode (214) and oxygen evolution electrode (216) are depicted for clarity of the description herein. The process operating electrochemical cell system may comprise a first discharge step 202 which may be initiated subsequent to a previous charge step (not depicted). As depicted in FIG. 2, discharge step 202 initiates with fuel electrode 212a at 100% state-of-charge (SOC) and fuel electrode 212b at 0% SOC (Again, in these examples, absolute numbers 0% and 100% are used for illustrative purposes, but in practice different thresholds may be used, such as 5 or 10% and 90 or 95%, for example.) Fuel electrode 212a is associated with switch 220a and fuel electrode 212b is associated with switch 220b. During discharge step 202, fuel electrode 212a is connected to the load 230 via switch 220a, and operates as an anode so that electrons given off by the metal fuel, as the fuel is oxidized at the fuel electrode 212a, flows through external load 230 to oxidant reduction electrode 214 functioning as a cathode. In the illustrated embodiment, switch 220b is open such that fuel electrode 212b is not involved in the discharge process. During charge step 202, the state-of-charge of fuel electrode 212a will decrease. Discharge step 202 may terminate as a result of an external condition (e.g. grid power supply becomes available), a voltage measurement, a current measurement, an impedance measurement, a cumulative SOC (Ah), a temperature measurement, a charge capacity measurement, a cycle number, an elapsed time, a predetermined schedule, a manual user command or a combination thereof.

Subsequent to discharge step 202, charge step 204 initiates with fuel electrode 212a at a partial state of charge e.g. 50% SOC and fuel electrode 212b with low or zero state of charge e.g. 0% SOC. During charge step 204, fuel electrode 212b is connected to power supply 240 via switch 220b, and operates as a cathode so that oxidized fuel within the ionically conductive medium is reduced at fuel electrode 212b. Charging electrode 216 functions as the anode during charge, and oxidizes the reduced oxidant that contacts charging electrode 216. During charge step 204, fuel electrode 212a is disconnected from power supply 240 via switch 220a and remains at 50% SOC. During charge step 204, the state-of-charge of fuel electrode 212b will increase. At the end of charge step 202, fuel electrode 212b may become fully charged or as depicted, partially charged to, for example, 50% SOC. Charge step 204 may terminate as a result of an external condition (e.g. grid power supply becomes unavailable), a voltage measurement, a current measurement, an impedance measurement, a cumulative SOC (Ah), a temperature measurement, a charge capacity measurement, a cycle number, an elapsed time, a predetermined schedule, a manual user command or a combination thereof.

Subsequent to charge step 204, discharge step 206 may initiate with fuel electrode 212a at 50% state-of-charge (SOC) and fuel electrode 212b at 50% SOC. During discharge step 206, fuel electrode 212a is connected to load 230 via switch 220a, and operates as an anode so that electrons flow through external load 230 to oxidant reduction electrode 214, thereby decreasing the state-of-charge of fuel electrode 212a. In the illustrated embodiment, switch 220b is open such that fuel electrode 212b is not involved in the discharge process and remains at 50% SOC. Discharge step 206 may terminate as a result of an external condition (e.g. grid power supply becomes available), a voltage measurement, a current measurement, an impedance measurement, a cumulative SOC (Ah), a temperature measurement, a charge capacity measurement, a cycle number, an elapsed time, a predetermined schedule, a manual user command or a combination thereof.

Subsequent to discharge step 206, charge step 208 initiates with fuel electrode 212a with low or zero state of charge e.g. 0% SOC and fuel electrode 212b at a partial state of charge e.g. 50% SOC. During charge step 208, fuel electrode 212b is connected to power supply 240 via switch 220b, and operates as a cathode so that oxidized fuel within the ionically conductive medium is reduced at fuel electrode 212b. Charging electrode 216 functions as the anode during charge, and oxidizes the reduced oxidant that contacts charging electrode 216. During charge step 208, fuel electrode 212a is disconnected from power supply 240 via switch 220a and remains at a low or 0% SOC. During charge step 208, the state-of-charge of fuel electrode 212b will increase. At the end of charge step 208, fuel electrode 212b may become fully charged i.e. 100% SOC as depicted. Charge step 208 may terminate as a result of an external condition (e.g. grid power supply becomes unavailable), a voltage measurement, a current measurement, an impedance measurement, a cumulative SOC (Ah), a temperature measurement, a charge capacity measurement, a cycle number, an elapsed time, a predetermined schedule, a manual user command or a combination thereof.

In the illustrated embodiment of FIG. 2, switch 220a and switch 220b are depicted in a simplified manner to facilitate the operational description, however it should be appreciated that the circuits and switches may vary widely across embodiments. In an embodiment, switches 220 may comprise semiconductor switches. For example, a Field Effect Transistors (FET) may be employed. In some embodiments, switches may open and close according to a duty cycle provided by a pulse width modulator and amplification may be variable depending on the duty cycle from the pulse width modulator. Various switching system configurations and operations thereof are possible, for example, such as those described in U.S. Pat. No. 8,309,259 and U.S. application Ser. Nos. 12/885,268; 13/083,929; 13/299,167; 13/230,549; 13/277,031 and 14/039,285, previously incorporated by reference herein in their entirety.

In an embodiment, switches may essentially act as a throttle regulating flow of electricity from the fuel electrodes within the electrochemical cell system. For example, in discharge step 206 of FIG. 2, switch 220b may not be fully open but instead be provided as a FET switch operating as a variable resistor in a linear mode such that its channel resistance is regulated by an associated gate voltage. In such an embodiment, the fuel electrode 212b may provide fraction of the power to external load 230 in addition to the majority of current from fuel electrode 212a. Depending on the desired operating conditions and load demands, the channel resistance may be increased to minimize the contribution of current from fuel electrode 212b to external load 230. In other embodiments, the channel resistance of a fuel electrode or group of fuel electrodes may be minimized to force depletion of fuel in a normal operating mode or during a conditioning mode (e.g. reset or deep discharge) and the resulting current may also contribute to powering the external load. In this way, cell maintenance may be performed while still providing power to an external load.

In some embodiments, under certain conditions, a recently discharged, non-depleted anode may subsequently undergo a charge. For example, this may occur if both electrode pairs are in a partial state of charge and (e.g. 50% and 50%) and the subsequent discharge step demands 50% depth of discharge (DOD). That is, the load demands may be greater than the energy or power available just from the electrodes) assigned to discharge. In this situation, one electrode pair e.g. 112a/112c would have ~10% SOC (since it may not be possible to support a full load at less than ~10% SOC) and the other electrode pair e.g. 112b/112d would reach 40% SOC. On the subsequent charge, it may then be beneficial to charge directly on the 112a/112c pair at ~10% SOC (just discharged anode pair) before entering a deep discharge step.

Figure 3:
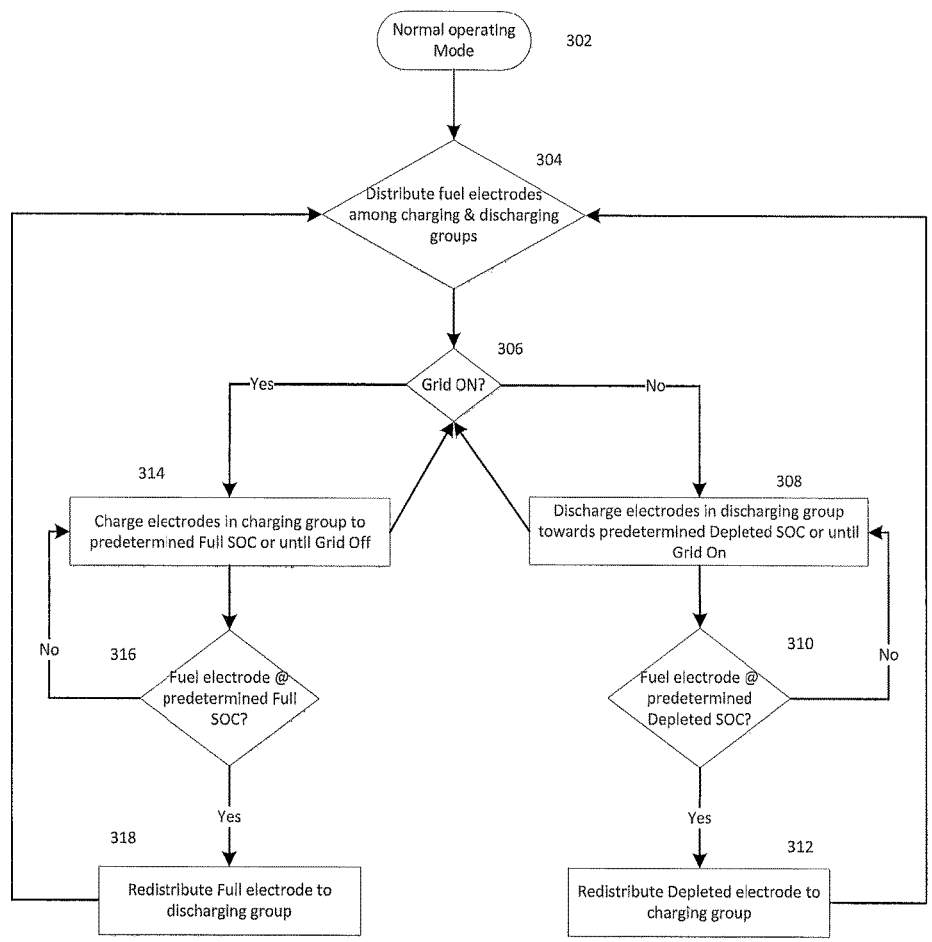
FIG. 3 depicts a simplified process flow diagram of operating an electrochemical cell system in a normal operating mode.

As depicted in FIG. 3, an electrochemical cell system may enter a normal operating mode 302. In an embodiment, a controller associated with the electrochemical cell system may distribute the fuel electrodes of the electrochemical cell system into groups, the groups comprising a discharging group and a charging group at step 304. Depending on the desired operating conditions, the controller may regulate operation between a charging mode and a discharging mode. In the non-limiting example of FIG. 3, the availability of an external grid may determine the operative mode of the electrochemical cell system at step 306. If the grid is unavailable, fuel electrodes within the discharging unit may be discharged towards a predetermined depleted state-of-charge at step 308. The predetermined depleted state-of-charge value or depletion criteria may be informed by a voltage measurement, current measurement, impedance measurement, an elapsed time, a calculated SOC or accumulated SOC. State-of-charge need not be measured directly, and may be estimated or indirectly measured through various techniques, which are already known. As a non-limiting example, if the cell voltage during discharge of the discharging group drops below 1 volt, or 0.975 volts, or perhaps 0.95 volts in the case of a zinc-air system in order to maintain power to a load, the discharging group would be considered to be depleted and discharging would switch to the other fuel electrode group. Voltage in many chemistries is correlated to state-of-discharge, and thus may be used as an indirect or estimated measurement thereof. Alternatively, if the state-of-charge value dropped below 20%, or below 15%, or preferably below 10%, the discharging group would be considered to be depleted and the discharging would switch to the other fuel electrode group.

In an embodiment, the predetermined depleted state-of-charge is less than the state-of-charge prior to initiation of discharging and may be, for example, in the range of 0% SOC to 20% SOC. If a fuel electrode within the discharging group reaches the predetermined depleted state of charge at step 310, it may be reassigned to the charging group at step 312. When the grid becomes available at step 306, the electrochemical cell system will charge fuel electrodes within the charging group to a predetermined full state-of-charge at step 314. The predetermined Full state-of-charge value or loading criteria may be informed by a voltage measurement, current measurement, impedance measurement, an elapsed time, a calculated SOC or accumulated SOC. In an embodiment, the predetermined Full state-of-charge is greater than the state-of-charge prior to initiation of charging and may be in the range of 90% SOC to 100% SOC. Alternatively, the charging electrode group could be considered to be in a Full state-of-charge if the charging voltage exceeds, for example, a value of 2.5 volts, or 2.6 volts, for a Zn-air cell or some other voltage limit determined by the design and chemistry of the cell. If a fuel electrode within the charging unit reaches the predetermined Full state of charge at step 316, it may be reassigned to the discharging unit at step 318.

The controller may distribute fuel electrodes between groups based on a voltage measurement, a current measurement, an impedance measurement, a cumulative SOC (Ah), a temperature measurement, a charge capacity measurement, a cycle number, an elapsed time, a predetermined schedule, a manual user command or a combination thereof. For example, one or more sensing devices associated with the cell system 100 may be configured to measure these measurements, and/or may derive these measurements from these or other measurements. In an embodiment, the measurements may be for one or more cells 110 in the cell system 100, or may be for the cell system 100 as a whole. In an embodiment, the one or more sensing devices may be coupled to a controller (e.g., electronics, circuitry, and/one or more processors) configured to receive sensed data from the one or more sensor devices. In an embodiment, the controller may be configured to cause the selective charging or discharging of the cells 110, as described herein. In an embodiment, the controller may be configured to continue measuring, computing, or estimating the measurements of one or more of the fuel electrodes 112 or elsewhere in the cell system 100, and may selectively control the charging and/or discharging of cells 110 according to the measurements.

While not depicted in the simplified example of FIG. 3, the groups into which fuel electrodes are distributed may further comprise a conditioning unit. For example, fuel electrodes within the conditioning group may enter a resetting process configured to remove dendritic formations present at the fuel electrode e.g. deep discharge, charge-discharge pulsing. In some embodiments, a separate conditioning mode may be employed. Conditioning or resetting of the electrochemical cell system may be accomplished by any appropriate process. In some embodiments, the conditioning process is initiated when power from an external power source is available. Additionally, the controller may instruct the cell system 100 to enter and/or exit a conditioning process by determining if a fuel electrode 112 and/or cell 110 should be reset and/or charge-discharge pulsed. For example, embodiments of such resetting processes may include charge-discharge pulsing, or resetting processes such as those disclosed in U.S. patent application Ser. No. 13/277,031 and U.S. Provisional Patent Application No. 61/890,728 entitled "Method of Operating and Conditioning Electrochemical Cells Comprising Electrodeposited Metal Fuel," previously incorporated by reference above.

In some embodiments, one or more of the electrode bodies 114a-d, oxidant reduction electrodes 112a-d and/or the charging electrodes 116a-d may be interconnected by the switching system, or any other circuit, so as to selectively facilitate control of the charging and discharging of the cell 100. Switches associated with the switching system may be controlled by a controller, which may be of any suitable construction and configuration, including but not limited to, in some embodiments, conforming generally to those disclosed in U.S. application Ser. Nos. 13/083,929, 13/230,549, and 13/299,167, incorporated in their entirety. In various embodiments, the control of the switches of the switching system may be determined based on a user selection, a sensor reading, or by any other input. In some embodiments, the controller may also function to manage connectivity between a load and a power source and a plurality of the cells 100. In some embodiments, the controller may include appropriate logic or circuitry for actuating bypass switches in response to detecting a voltage reaching a predetermined threshold (such as drop below a predetermined threshold) or any other suitable metric.

For example, the controller may include a solid-state and/or programmable microcontroller, circuitry, an integrated circuit, or any combination of elements.

The foregoing illustrated embodiment(s) have been provided solely to illustrate the structural and functional principles of the present invention and are not intended to be limiting. To the contrary, the present application is intended to encompass all modifications, alterations, substitutions and equivalents within the spirit and scope of the appended claims.

What is claimed:

1. A process for operating an electrochemical cell system, wherein the electrochemical cell system comprises:
   (i) at least two fuel electrodes for receiving electrodeposited metal fuel;
   (ii) at least one oxidant electrode spaced apart from the fuel electrodes;
   (iii) at least one charging electrode;
   (iv) an ionically conductive medium communicating the electrodes of the electrochemical cell system for conducting ions to support electrochemical reactions at the fuel, oxidant, and charging electrodes, the ionically conductive medium comprising reducible metal fuel ions;
   wherein the process comprises:
   (i) assigning the fuel electrodes into units, the units comprising: a discharging unit and a charging unit;
   (ii) operating said cell system in a discharge mode wherein the metal fuel is oxidized at each fuel electrode in the discharging unit and an oxidant is reduced at the at least one oxidant electrode to generate an electrical discharge current therebetween for application to a load;
   (iii) operating said cell system in a charging mode wherein a reducible species of the fuel is reduced to electrodeposit the fuel on each fuel electrode in the charging unit and oxidize an oxidizable species of the oxidant at the charging electrode by application of an electrical charge current therebetween from a power source;
   (iv) monitoring each of the fuel electrodes in the discharging unit during said discharge mode, wherein each fuel electrode in the discharging unit meeting a predetermined depletion criteria is assigned from the discharging unit to the charging unit, and wherein each fuel electrode not meeting the predetermined depletion criteria remains assigned to the discharging unit including for a subsequent discharge mode; and
   (v) monitoring each of the fuel electrodes in the charging unit during said charging mode, wherein each fuel electrode in the charging unit meeting a predetermined loading criteria is assigned from the charging unit to the discharging unit, and wherein each fuel electrode not meeting the predetermined loading criteria remains assigned to the charging unit including for a subsequent charge mode.

2. The process according to claim 1, wherein the charging electrode is selected from the group consisting of (a) the oxidant electrode, (b) a third electrode, and (c) part of the fuel electrode.

3. The process according to claim 1, wherein the predetermined depletion criteria is a state-of-charge below a threshold in the range of 0% to 20%.

4. The process according to claim 1, wherein the predetermined depletion criteria is a voltage below a threshold of approximately 1.0 volts.

5. The process according to claim 1, wherein the predetermined loading criteria is state-of-charge above a threshold in the range of 90% to 100%.

6. The process according to claim 1, wherein the predetermined loading criteria is a voltage above a threshold of approximately 2.5 volts.

7. The process according to claim 1, wherein the units into which fuel electrodes are distributed further comprises a conditioning unit; and, the process further comprises conditioning each fuel electrode within the conditioning unit.

8. The process according to claim 7, wherein the conditioning of each of the fuel electrodes within the conditioning unit comprises a resetting process configured to remove dendritic formations present at each fuel electrode in the conditioning unit.

9. The process according to claim 7, wherein the conditioning each fuel electrode within the conditioning unit comprises charge-discharge pulsing to remove dendritic formations at each fuel electrode in the conditioning unit.

10. The process according to claim 7, wherein the conditioning each fuel electrodes within the conditioning unit comprises discharging electrical discharge current from the fuel electrodes in the conditioning unit for application to the load.

11. An electrochemical cell system, wherein the electrochemical cell system comprises:
   (i) at least two fuel electrodes for receiving electrodeposited metal fuel;
   (ii) at least one oxidant electrode spaced apart from the fuel electrodes;

(iii) at least one charging electrode;
(iv) an ionically conductive medium communicating the electrodes of the electrochemical cell system for conducting ions to support electrochemical reactions at the fuel, oxidant, and charging electrodes, the ionically conductive medium comprising reducible metal fuel ions;

and, one or more controllers configured to:
  assign the fuel electrodes into units, the units comprising: a discharging unit and a charging unit;
  operate the cell system in a discharging mode wherein the metal fuel is oxidized at each fuel electrode in the discharging unit and an oxidant is reduced at the at least one oxidant electrode to generate an electrical discharge current therebetween for application to a load;
  operate the cell system in a charging mode wherein a reducible species of the fuel is reduced to electrodeposit the fuel on each fuel electrode in the charging unit and oxidize an oxidizable species of the oxidant at the charging electrode by application of an electrical charge current therebetween from a power source;
  monitor each of the fuel electrodes in the discharging unit during said discharge mode, wherein the one or more controllers is further configured to assign each fuel electrode in the discharging unit meeting a predetermined depletion criteria from the discharging unit to the charging unit and wherein each fuel electrode not meeting the predetermined depletion criteria remains assigned to the discharging unit including for a subsequent discharge mode, and
  monitor each of the fuel electrodes in the charging unit during said charging mode, wherein the one or more controllers is further configured to assign each fuel electrode in the charging unit meeting a predetermined loading criteria from the charging unit to the discharging unit and wherein each fuel electrode not meeting the predetermined loading criteria remains assigned to the charging unit including for a subsequent charge mode.

12. The electrochemical cell system according to claim 11, the charging electrode being selected from the group consisting of (a) the oxidant electrode, (b) a third electrode, and (c) part of the fuel electrode.

13. The electrochemical cell system according to claim 11, wherein the fuel electrode of the first electrochemical cell comprises a series of permeable electrode bodies arranged in spaced apart relation.

14. The electrochemical cell system according to claim 11, wherein the electrochemical cell system further comprises a switching system, wherein the switching system comprises a switch associated with each fuel electrode of the electrochemical cell system.

15. The electrochemical cell system according to claim 14, wherein said switch is configured to operate as a variable resistor; and wherein the resistance of said switch is regulated by the controller.

16. The electrochemical cell system according to claim 11, wherein the predetermined depletion criteria is a state-of-charge below a threshold.

17. The electrochemical cell system according to claim 11, wherein the predetermined depletion criteria is a voltage below a threshold.

18. The electrochemical cell system according to claim 11, wherein the predetermined loading criteria is state-of-charge above a threshold.

19. The electrochemical cell system according to claim 11, wherein the predetermined loading criteria is a voltage above a threshold.

* * * * *